Figure 1:
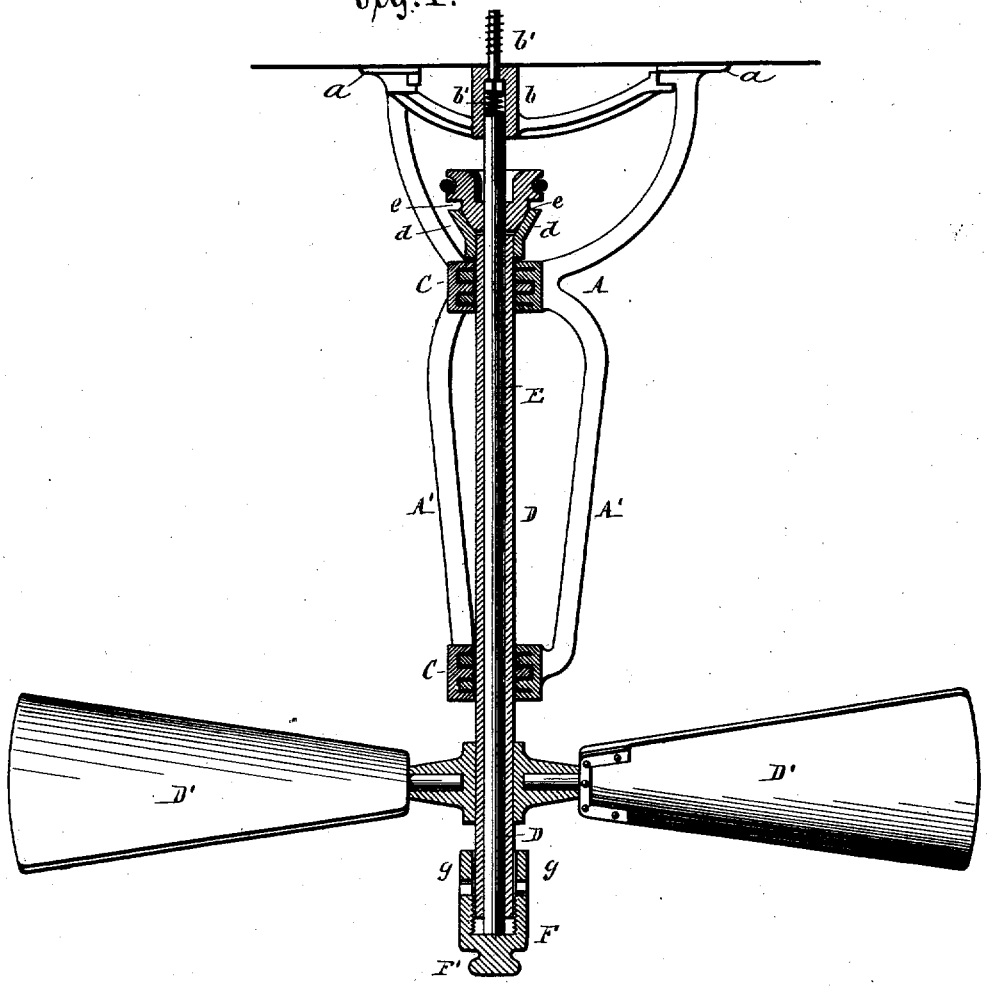
Figure 1A:
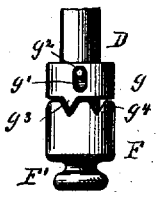

2 Sheets—Sheet 1.

P. MURRAY, Jr.

Assignor, by mesne Assignments, to the BACKUS MANUFACTURING COMPANY.

FAN ATTACHMENT.

No. 10,815. Reissued Mar. 8, 1887.

WITNESSES:

Fol. N. Rosenbaum.

Carl Karp

INVENTOR

Peter Murray jr.

BY Goepel & Raegener

ATTORNEYS.

N. PETERS, Photo-Lithographer, Washington, D. C.

2 Sheets—Sheet 2.
P. MURRAY, Jr.
Assignor, by mesne Assignments, to the BACKUS MANUFACTURING COMPANY.
FAN ATTACHMENT.
No. 10,815. Reissued Mar. 8, 1887.
Fig. 2.
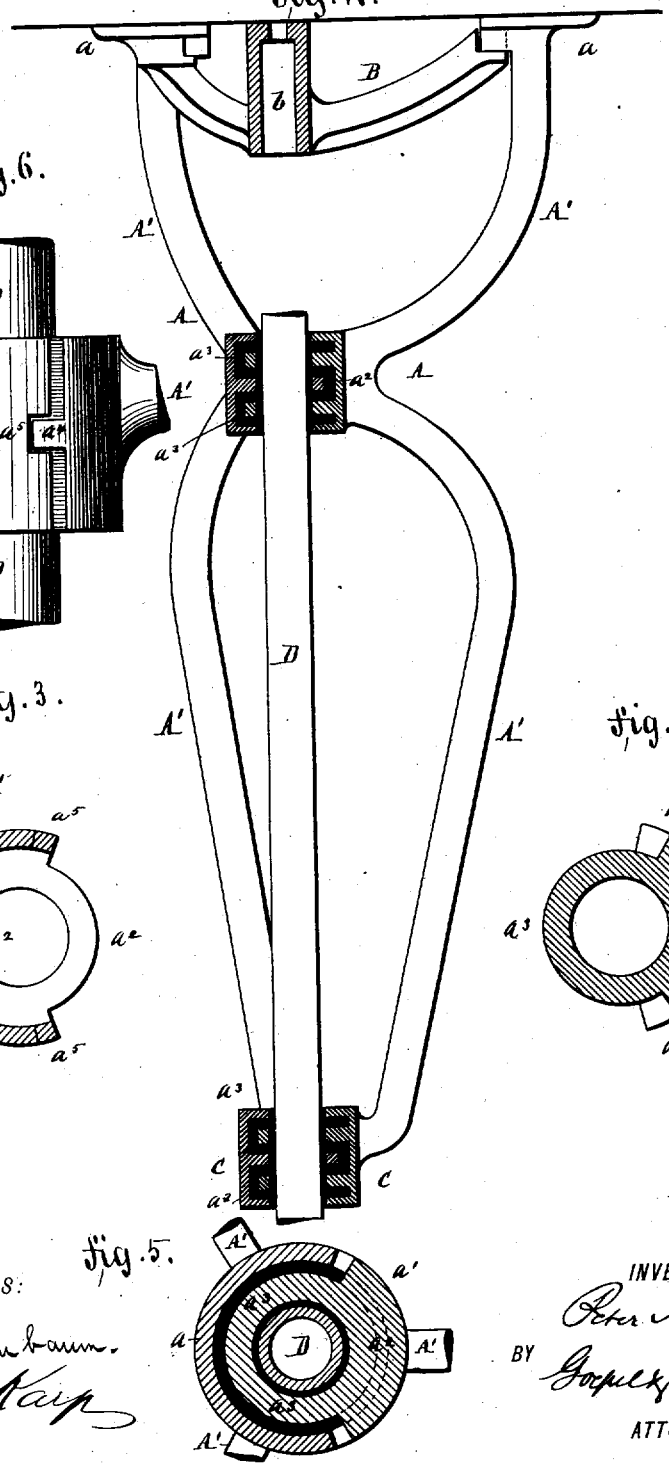
Fig. 6.
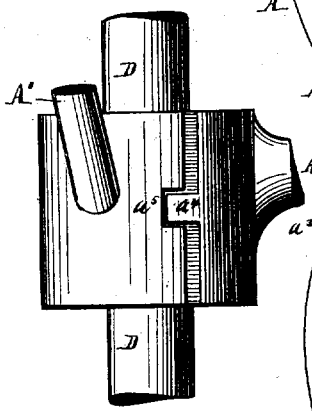
Fig. 3.
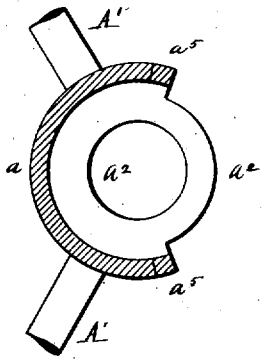
Fig. 4.
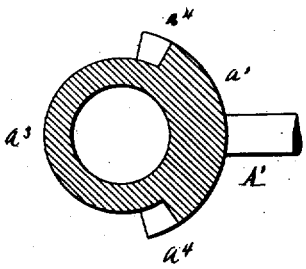
Fig. 5.
WITNESSES:
Jos. N. Rosenbaum.
Carl Kaiser
INVENTOR
Peter Murray jr.
BY Goepel & Langner
ATTORNEYS.
N. PETERS, Photo-Lithographer, Washington, D. C.

UNITED STATES PATENT OFFICE.

PETER MURRAY, JR., OF NEWARK, N. J., ASSIGNOR, BY MESNE ASSIGNMENTS, TO THE BACKUS MANUFACTURING COMPANY OF NEW JERSEY.

FAN ATTACHMENT.

SPECIFICATION forming part of Reissued Letters Patent No. 10,815, dated March 8, 1887.

Original No. 336,866, dated February 23, 1886. Application for reissue filed May 15, 1886. Serial No. 202,346.

*To all whom it may concern:*

Be it known that I, PETER MURRAY, Jr., of Newark, in the county of Essex and State of New Jersey, have invented certain new and useful Improvements in Automatic Fans; and I do hereby declare the following to be a full, clear, and exact description of the invention, that will enable others skilled in the art to which it appertains to make and use the same, reference being had to the accompanying drawings, and to the letters of reference marked thereon, which form a part of this specification.

This invention has reference to an improved automatic fan that is suspended from the ceiling of an office or other space, so as to agitate the air in warm weather; and the invention consists of a tubular fan-shaft, which is supported in bearings of a hanger-frame attached to the ceiling, and of an interior rotary shaft that passes through said tubular shaft and is guided in a central socket of the upper part of the hanger-frame, said interior shaft being provided with a friction-disk that engages a friction-disk of the fan-shaft so as to impart rotary motion to the same. An adjusting device is arranged at the lower end of the tubular fan-shaft, by which the interior driving-shaft is adjusted higher or lower against the tension of a spiral spring pressing on its upper end, so as to establish or discontinue the frictional contact between the friction-disks. The adjusting device consists of an interiorly-threaded socket, which engages the lower threaded end of the tubular fan-shaft, and which is retained in position by a sliding collar having a stop-tooth that engages one of the notches of the socket. The hanger-frame is made of three arms that are cast integral with segmental sections of the shaft-bearings, said sections having ring-shaped extensions, which are united by filling the intermediate space with anti-friction metal. The hanger-frame is attached to the ceiling by a three-armed frame or "crab" having a central socket attached to the ceiling, said crab engaging the enlarged heads of the hanger-sections and supporting them rigidly on the ceiling.

In the accompanying drawings, Figure 1 represents a vertical central section of my improved automatic fan. Fig. 1[a] is a detail side view of the device by which the interior driving-shaft is raised or lowered. Fig. 2 is a vertical central section of the hanger-frame, showing the connection of the hanger-sections; and Figs. 3, 4, 5, and 6 are details of the journal-bearings of the hanger-frame, drawn on a larger scale, and showing the method of uniting the same.

Similar letters of reference indicate corresponding parts.

In the drawings, A represents the supporting hanger-frame of my improved automatic fan. The hanger-frame A is composed of three arms, A′, that are attached to the ceiling by enlarged heads or bearing-plates *a* and a three-armed frame or crab, B, the arms of which interlock at the ends with recesses of the bearing-plates, as shown in Figs. 1 and 2. The crab B is provided with a central socket, *b*, through which a fastening-screw, *b′*, is passed, by which the crab B and hanger-frame A are attached to and supported on the ceiling. The crab B serves for the purpose of adjusting the hanger-frame axially before attaching it to the ceiling, so that it does not interfere with the driving-belt by which motion is imparted to the fan-shaft. The hanger-frame A is provided with two or more journal-bearings, C C, for the fan-shaft, which bearings are made of cylindrical shape and formed of two interlocking segmental sections, *a a′*, of which one section is about twice the size of the other section and cast integral with two of the hanger-arms A′, while the third hanger-arm A′ is cast integral with the smaller section of the bearings C C. The larger segmental section, *a*, of each journal-bearing C is provided with one ring-shaped extension, $a^2$, while the smaller section, *a′*, is provided with two ring-shaped extensions, $a^3$. The smaller segmental section, *a′*, of each journal-bearing C is further provided with a central lug, $a^4$, at each side, which lugs enter into corresponding recesses, $a^5$, of the larger section, *a*, as shown in Figs. 3, 4, and 6. The lugs $a^4$ and recesses $a^5$ of the sections *a a′* serve to place the sections of the journal-bearings into their proper position toward each other when they are to be united. This is accomplished first by unlocking the sections *a a′* by their lugs and recesses; next, by passing the fan-shaft through the same, and, lastly, by filling the spaces between the interlocking rings of the bearing-sections with Babbitt or other suitable soft metal, by which the rigid union of said sections and the accurate fitting of the bearings C C to the fan-shaft is obtained, as shown in Figs. 1 and 2. The arms A′ of the hanger-frame A are thus rigidly locked together by the bearings. When a longer drop of the fan is required, a hanger-frame with longer arms is used, which arms are then provided with three or more journal-bearings and united in the manner described.

The tubular fan-shaft D is supported in the bearings C C of the hanger-frame A and provided at its lower end with a fan, D′, the hub of which is rigidly attached to the shaft D. The upper end of the tubular fan-shaft D is provided with a friction-disk, *d*, above the bearing C. Through the tubular fan-shaft D extends a rotary driving-shaft, E, that is guided at its upper end in the central socket, *b*, of the crab B, and acted upon by a spiral spring, *b′*, that is interposed between the shaft E and socket *b*, as shown in Fig. 1. A belt-and-pulley transmission imparts continuous rotary motion to the driving-shaft E, which latter is provided with a friction-disk, *e*, that forms frictional contact with the disk *d* of the fan-shaft D when the interior shaft, E, is lowered, whereby the disks form an effective friction-clutch for rotating the fan shaft D and fan D′. The friction-clutch *d e* is thrown in or out of gear, so as to impart rotary motion to the fan or stop the same, by an adjusting device at the lower end of the tubular fan-shaft D. The adjusting device consists of a screw-socket, F, that engages an interior screw-thread of the fan-shaft D. The socket F is provided with a button, F′, for being readily taken hold of. The interior fan-shaft rests on the bottom of the socket F, and is lifted by the same when it is screwed up on the tubular fan-shaft, or lowered when the socket is turned in opposite direction. The weight of the interior shaft, together with the tension of the spiral spring *b′*, acting on the upper end of the same, produces the effective clutching of the friction-disks.

To secure the position of the tubular socket on the tubular fan-shaft D when the same has been adjusted, it is retained by a slotted collar, *g*, that is guided by a slot, *g′*, on a fixed pin, $g^2$, of the fan-shaft D, said sleeve having a tooth or stop, $g^3$, that drops into notches of the socket F, as shown in Fig. 1[a]. When it is desired to impart rotary motion to the fan-shaft and fan, the screw-socket is turned down until the friction-disks of the shafts D and E are in contact, whereby the driving-shaft E imparts rotary motion to the fan-shaft and fan. When it is desired to stop the fan, the socket is taken hold of by the hand and screwed up on the fan-shaft, so as to raise the interior shaft, E, and disconnect thereby the friction-clutch. In this manner the fan-shaft can be readily thrown in or out of motion by the simple adjustment of the screw-socket and friction-clutch.

Having thus described my invention, I claim as new and desire to secure by Letters Patent—

1. The combination of a tubular shaft, a fan attached to said shaft, an interior rotary driving-shaft passing through said fan-shaft, a friction-clutch for imparting motion to the tubular fan-shaft, and mechanism, such as described, for lowering or raising the driving-shaft, so as to establish or interrupt the motion of the fan-shaft, substantially as set forth.

2. The combination of a tubular shaft, a fan attached to the same, a friction-disk at the upper end of the fan-shaft, a rotary driving-shaft passing through said fan-shaft and having also a friction-disk, and an adjusting device, such as described, applied to the lower end of the fan-shaft for raising or lowering the interior shaft and throwing the friction-disks in or out of mesh, substantially as set forth.

3. The combination of a tubular shaft, a fan attached to the same, an interior rotary driving-shaft, a guide socket attached to the ceiling in line with the driving-shaft, a spiral spring interposed between the socket and the upper end of the driving-shaft, a friction-clutch the members of which are applied to the fan-shaft and driving-shaft, and a device, such as described, for throwing the friction-clutch in or out of gear, substantially as set forth.

4. The combination of a tubular shaft, a fan attached to said shaft, a rotary driving-shaft passing through the fan-shaft, a friction-clutch for imparting motion to the fan-shaft, and a supporting hanger-frame attached to the ceiling and composed of arms having journal-bearings for the fan-shaft, and a crab having a central guide-socket for the interior driving-shaft, substantially as set forth.

5. A hanger-frame for supporting the fan-shaft, consisting of three arms, a three-armed crab engaging the enlarged heads of the hanger-arms, said crab having a central socket, and a fastening-screw for attaching said central socket to the ceiling, and bearings made of interlocking sections for uniting the hanger-arms, substantially as set forth.

6. A hanger-frame consisting of three arms and interlocking bearings, said bearings being formed of segmental sections cast integral with the hanger-arms and provided with extension-rings that are locked together by soft metal cast into the space between the same, substantially as set forth.

7. A hanger-frame consisting of three hanger-arms and a series of journal-bearings, said bearings being formed of segmental sections, which are cast integral with said arms and provided with extension-rings and central side lugs and recesses, and an interlocking body of soft metal cast into the spaces between said rings, substantially as set forth.

In testimony that I claim the foregoing as my invention I have signed my name in presence of two subscribing witnesses.

PETER MURRAY, Jr.

Witnesses:
SIDNEY MANN,
CARL KARP.